No. 810,777. PATENTED JAN. 23, 1906.
A. J. L. LEMBECK & N. B. HART.
SHAFT COUPLING.
APPLICATION FILED MAR. 22, 1905.
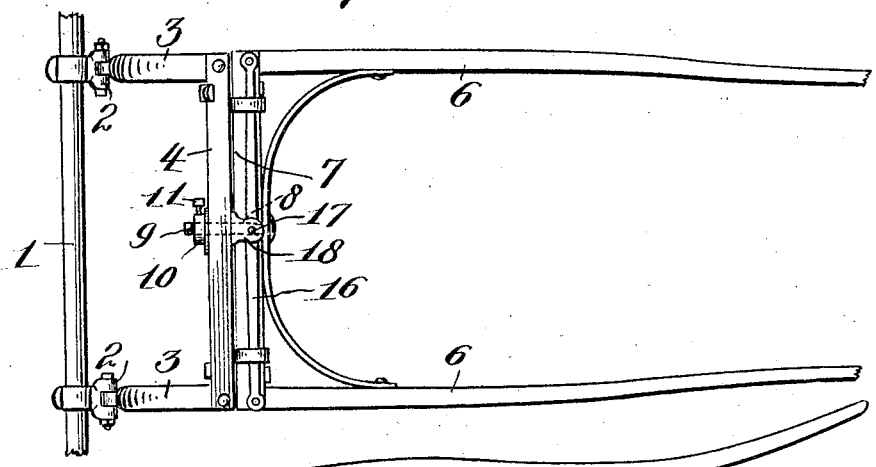
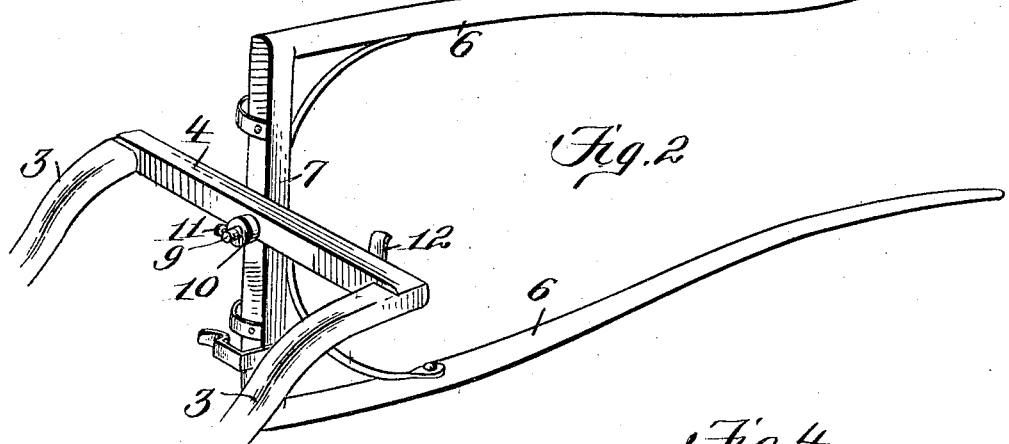
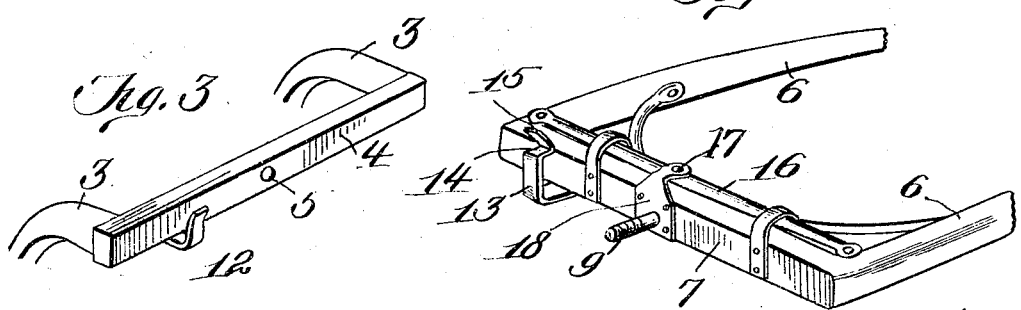
Witnesses:
E. D. Kesler
James L. Norris, Jr.
Inventors
Arthur J. L. Lembeck
Nat B. Hart
By James L. Norris
Atty

UNITED STATES PATENT OFFICE.

ARTHUR J. L. LEMBECK AND NAT B. HART, OF WALLA WALLA, WASHINGTON.

SHAFT-COUPLING.

No. 810,777.             Specification of Letters Patent.             Patented Jan. 23, 1906.

Application filed March 22, 1905. Serial No. 251,533.

*To all whom it may concern:*

Be it known that we, ARTHUR J. L. LEMBECK and NAT B. HART, citizens of the United States, residing at Walla Walla, in the county of Wallawalla and State of Washington, have invented new and useful Improvements in Shaft-Couplings, of which the following is a specification.

This invention relates to certain new and useful improvements in shaft-couplings, and has for its main object to provide means whereby the shafts and harness may be readily placed in position on the horse.

The invention is more particularly intended for use in connection with wagons or other vehicles which are liable to be suddenly called into action and where rapidity in harnessing the horse is a desideratum—such, for instance, as the wagon of the chief of the fire department or a police-patrol wagon.

Other objects of the invention relate to certain details of construction and to combinations and operations of parts, which will be more clearly understood from the detailed description to follow.

With the above-named objects in view the invention consists generally in pivotally mounting the shafts as a whole on a cross-bar mounted on the wagon, whereby said shafts may be turned from a horizontal to a vertical, or substantially vertical, position, this latter position of the shafts permitting the horse to be brought to a position alongside of the shafts without the necessity of backing the horse into or under the shafts, and when in such position the shafts can then be turned to the normal or horizontal position and the harness connections made.

The invention also consists in means for limiting the movement of the shafts in one direction and in means for locking the shafts in their normal position.

In order that the invention may be clearly understood, we have illustrated the same in the accompanying drawings, in which—

Figure 1 is a top plan view of a pair of shafts coupled to a cross-bar according to our invention. Fig. 2 is a perspective view showing the shafts turned to a vertical, or substantially vertical, position. Fig. 3 is a detail view showing the member to which the shafts as a whole are attached, and Fig. 4 is a detail view of the corresponding shaft member.

1 indicates the axle of a vehicle, to which are connected, by the ordinary thill-couplings 2, the thills 3. The thills 3 are connected at their forward ends by a cross-bar 4, which is provided with a central aperture 5.

6 indicates the two tongues constituting the shafts proper, and the shafts are connected at their rear ends by a cross-bar 7, which is provided with a central aperture 8, adapted in use to aline with the aperture 5. The shafts are connected to the cross-bar 5 by means of a king-bolt 9, to which a nut 10 and a binding-screw 11 are applied.

Mounted on the cross-bar 4, near one end thereof, is a clip 12, which, as shown by Figs. 2 and 3, projects forwardly of said cross-bar and has an upwardly-extending member at its outer end, the clip 12 being adapted to receive the cross-bar 7 when the shafts are turned to their normal position.

Mounted on the cross-bar 7 is a spring-clip 13, which projects rearwardly of said cross-bar and is provided at its outer end with an upward extension having an inwardly-extending shoulder 14 and a thumb-piece 15, said spring-clip being adapted when the shafts are turned to the normal position, as shown by Fig. 1, to spring over the cross-bar 4, so that the shoulder 14 will engage the upper side of said cross-bar and prevent the shafts from turning. The spring-clip 13 is located on the side of the shafts opposite to that at which the clip 12 is located, and these two clips will operate to hold the shafts firmly after they have been drawn into position for use. A washer or washers (not shown) may be placed over the bolt 9 between the cross-bars 4 and 7 to permit the ready turning of the shafts without binding.

16 indicates a swingletree which is pivotally mounted on the cross-bar 7 by means of a bolt 17, which passes through one member of a bracket-arm 18, the other member of said bracket-arm extending downward between the cross-bars 4 and 7 and having the bolt 9 passed through the same. This bracket-arm 18 may itself serve as the washer for separating the cross-bars 4 and 7 to permit turning movement of one relative to the other without binding.

As is well known, vehicles of the general description of those above mentioned usually stand with the shaft supported in an elevated position and the harness attached to the shafts and also properly suspended above the same, and when the horse is backed into the shafts or under the shafts the harness and shafts are dropped over the horse, and by connecting a few members of the harness, such as the collar and the girth-straps, the wagon is ready to be driven off. In such devices, however, considerable delay is frequently caused by the fact that the horse, being suddenly liberated, often by the sound of a gong, is in a nervous or excited condition, and it is frequently difficult to back him into the shafts or to the proper position under the shafts. According to our invention the shafts are turned to the position shown by Fig. 2 and the horse can readily be brought to position opposite the shafts and can then be readily made to move sidewise a slight distance and the shafts can be turned to the position shown in Fig. 1 and the harness connections made. It will be seen that when the shafts are turned to the position shown in Fig. 2 the under shaft or tongue 6 will serve as a guard to limit the distance to which the horse moves sidewise, and thus the correct position of the horse can be secured with certainty and rapidity. The subsequent turning of the shafts to the normal position is but the work of a moment or may be effected by drawing the parts of the harness about the horse without requiring a separate manipulation of the shafts.

Our invention does not necessitate any change in the construction of the ordinary vehicle, and the shafts as now constructed can be readily changed to have our construction by simply sawing through the shafts at the rear of the cross-bar 7, attaching the cross-bar 4 to the thills 3, and then connecting the two cross-bars by means of the bolt 9 and supplying them with the clips 12 and 13.

Having thus fully described our invention, what we claim is—

1. In combination with a pair of thill members connected by a cross-bar, a pair of shafts connected by a cross-bar, said cross-bars being pivotally united to permit free rotation of the shafts, and means for locking the shafts in their normal position.

2. In combination with a pair of thill members connected by a cross-bar, a pair of shafts connected by a cross-bar, said cross-bars being pivotally united to permit free rotation of the shafts, a clip for limiting the movement of the shafts in one direction, and a spring-clip mounted on one of said cross-bars and adapted to engage the other for locking the shafts in their normal position.

3. In combination with a pair of shafts pivotally connected to a wagon member to rotate freely thereon, means for limiting the movement of said shafts in one direction, and means for locking the shafts in their normal position.

4. In combination with a pair of thill members connected by a cross-bar, a pair of shafts connected by a cross-bar, a king-bolt passed through said cross-bars and forming a pivot upon which said shafts may freely rotate, a bracket-arm secured between said cross-bars by said king-bolt, and a swingle-tree mounted on the cross-bar of said shafts and being pivotally secured thereon by a bolt passing through said bracket-arm.

In testimony whereof we have hereunto set our hands in presence of two subscribing witnesses.

ARTHUR J. L. LEMBECK.
NAT B. HART.

Witnesses:
  WM. METZ,
  H. HOWARD.